J. A. STAPLES.
VALVE.
APPLICATION FILED DEC. 26, 1907.
949,852.
Patented Feb. 22, 1910.
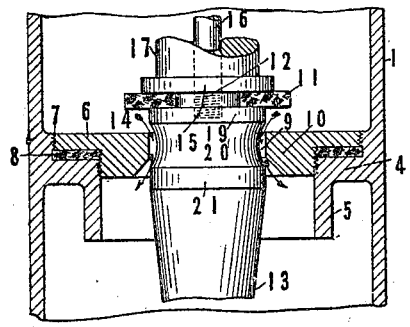
Fig. 2.
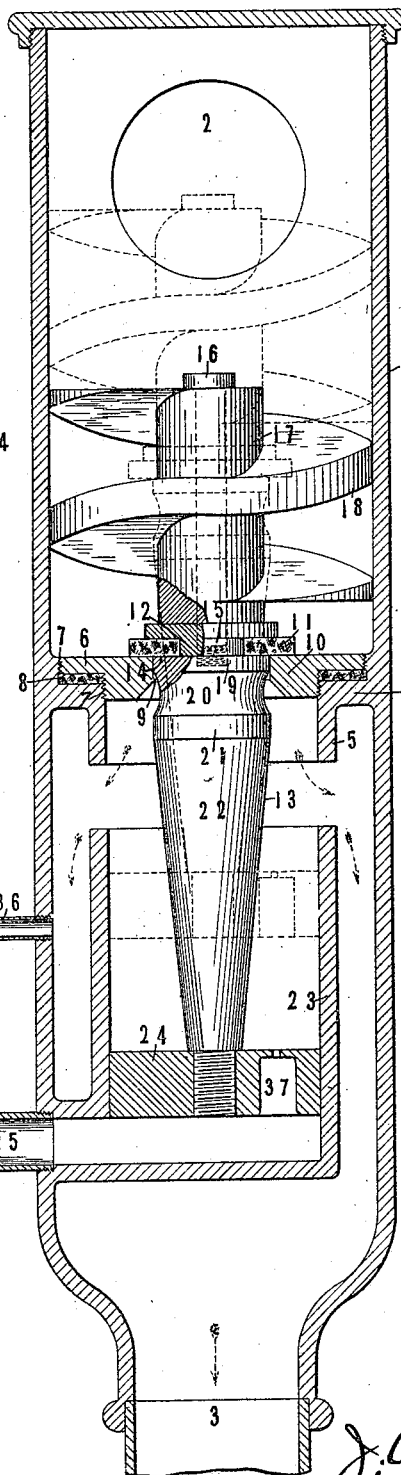
Fig. 1.
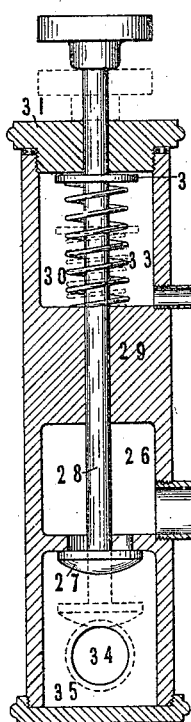
WITNESSES
Norvin Perry
Samuel L. Alpert.
INVENTOR
J. A. Staples
BY
Duell, Warfield & Duell
ATTORNEYS

UNITED STATES PATENT OFFICE.

JOHN A. STAPLES, OF NEWBURGH, NEW YORK.

VALVE.

949,852.

Specification of Letters Patent.   Patented Feb. 22, 1910.

Application filed December 26, 1907.   Serial No. 408,192.

*To all whom it may concern:*

Be it known that I, JOHN A. STAPLES, residing at Newburgh, in the county of Orange and State of New York, have invented certain new and useful Improvements in Valves, of which the following is a full, clear, and exact description, such as will enable others skilled in the art to which it appertains to make and use the same.

This invention relates broadly to valves and with regard to the more specific details thereof, to apparatus for use in flushing closets and the like.

One of the objects thereof is to provide practical and efficient means for regulating the flow of water to a closet bowl.

Another object is to provide simple and positively acting means of the above type, for automatically forming an afterfill or seal to a closet bowl.

Another object is to provide efficiently acting means adapted to close a valve with certainty and precision.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

In the accompanying drawing, wherein is shown one of various possible embodiments of this invention, Figure 1 is a sectional elevation of the same. Fig. 2 is a similar view of a portion of the same, showing the parts in a different position.

Similar reference characters refer to similar parts throughout both views of the drawing.

Referring now to Fig. 1 of the drawing, there is shown a casing 1 provided with a supply port 2 and a discharge passage 3. This entire casing forms, broadly speaking, a conduit, leading from the source of supply to the discharge opening, and this invention deals largely with the control of the passage throughout this conduit. Formed within casing 1 is a shoulder 4 having a depending lip or flange 5. Upon this annular shoulder is mounted a collar 6 which has fluid tight connection therewith as by the threads 7 and packing 8. Within collar 6 is formed an opening 9, the portions of the collar about the same forming a valve seat 10 adapted to coact with the gasket 11 of a valve 12.

Considering this valve more in detail, there is provided a member 13, having a shoulder 14 upon which gasket 11 rests, and, preferably, a separate ring or collar 15 fitting within the gasket and projecting over and holding the same in position. Secured to the valve as by a threaded connection or other means, is a headed pin 16 having journaled thereon a sleeve 17 provided with a spiral wing or flute 18 for a purpose hereinafter described. The member 13 adjacent shoulder 14 is of cylindrical conformation, as shown at 19 and beneath this part is a groove or recess 20 which, in this illustrative embodiment, extends entirely about the member, although it may take the form of one or more single recesses, and this invention comprehends such construction although that shown possesses certain advantages. Immediately beneath the recess 20 is a second cylindrical portion 21 also adapted to fit the opening through the valve seat 10. Beneath portion 21 is a tapered portion 22, which extends downwardly and is connected with parts hereinafter described in detail. It will thus be seen that upon the valve being raised as to the position indicated in dotted lines in Fig. 1 of the drawing, water may pass from the supply port and upper portion of the casing through the opening in the valve seat about the member 13, and thence beneath the lip 5 and to the discharge passage 3.

The means for raising the valve comprise the following parts: Mounted within the lower portion of casing 1 is a cylinder 23 having fitted therein a piston 24 threaded upon the lower end of the tapered member 22 above described. This cylinder is connected as by the passage 25 with a chamber 26 controlled by an auxiliary valve 27. The latter member is provided with a push rod 28 extending through a guide 29, and thence passing through a chamber 30 and a head or cap 31. The rod or spindle 28 is provided with a collar 32 fixed thereon, and the valve is held against its seat as by a spiral spring 33 compressed between this collar and the guide 29. A supply port 34 preferably leading from the same source of supply as that of the port 2 communicates with a chamber 35 beneath the valve 27, and upon the same being depressed, as indicated in dotted lines in the drawing, the water passes through chamber 26 and passage 25 into the lower portion of the cylinder 23 and tends to force the piston 24 upwardly. Any water leaking past the spindle 28 into the chamber 30 is drained as by the tube 36 into the main casing 1 and may pass out through the discharge port. Formed within the piston 24 is a relief port 37 preferably of substantially the type shown. This port, which is of a relatively large diameter throughout the greater portion of the piston, and thence of a smaller diameter to its upper surface, acts to release the water held beneath the piston 24, upon valve 27 being permitted to close, and thus permits the downward movement of the main valve 12.

Certain features of this construction will be the more readily understood from a consideration of my copending application, Serial Number 303,757, filed March 2nd, 1906, and certain features herein shown and described are shown, described and claimed in the above application and accordingly are not claimed herein.

The operation of the above described embodiment of my invention is substantially as follows: Assuming the parts to be in the positions indicated in full lines in Fig. 1 of the drawing, and that it be desired to flush a closet or the like, the push rod 28 is depressed to the position indicated in dotted lines. Water then passes from supply port 34 beneath the piston 24, as above described, and the area of this piston being materially greater than the effective area of the main valve 12, the piston is quickly forced upwardly as indicated in dotted lines and temporarily prevents discharge as set forth in my copending application above referred to. Push rod 28 upon being released is snapped upwardly into closed position by the spring 33, and the escape of the water imprisoned in cylinder 23 through the port 37 permits the descent of the piston. Water thereupon rushes through the valve seat 10 as above described, being sufficient in volume and pressure, as by a proper conformation of the parts, to thoroughly flush the closet bowl, or perform other desired functions. The closing of the main valve is aided by the effect of the water impinging upon the spiral wing 18 which permits its passage, but tends to cause it to follow a circuitous course. The reactive effect of this deflecting of the water from its normal course exerts a downward pressure upon the valve, and enhances its certainty of action in closing. This effect of the momentum of the water upon the wing or flute 18 also causes a rotary movement of the sleeve 17, which does away with any tendency of its outer edges to bind against the inner walls of the casing and is otherwise advantageous. This rotary movement, however, is, in this construction, not imparted to the gasket 11, by reason of the fact that the sleeve 17 is loosely mounted upon the pin 16, and thus has a swivel connection with the valve. As the tapered member 22 descends it causes a decrease in flow of water, owing to its gradual increase in obstruction to the passage through the valve seat, and this rate of change of the flow by a proper conformation of parts, may be so varied as best to achieve the end in view. Upon the cylindrical portion 21 passing through the valve seat, the water is temporarily shut off, but upon the recessed portion 20 coming into the position indicated in Fig. 2 of the drawing, a slight additional flow of water is permitted, as shown by arrows, and this may be utilized to provide an afterfill or seal for the closet bowl. As the cylindrical portion 19 comes into the valve seat, the water is again cut off, and the gasket brought against the seat without tendency to chatter.

It may be noted, in connection with the action of port 37, that the same should be of smaller capacity than that of the supplying means for the cylinder 23, in order to cause water to accumulate beneath the piston and force the same upwardly. By reason of the conformation of the parts as shown a port of small effective diameter is provided through a piston of such thickness as to be most efficient, without the formation of a long and narrow passage which might become clogged in use by foreign matter in the water. It is also to be noted that by reason of the disposition of a relief port as shown herein, it is not exposed to the effect of any sediment which may become deposited from the water as at the bottom of the cylinder 23.

It will thus be seen that I have provided a construction in which the several objects of this invention are achieved, and the above enumerated advantages are, among others, present.

The entire device is simple, inexpensive and essentially practical, and its action is efficient and thoroughly reliable.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense. It is also to be understood that the language used in the following claims is intended to cover all of the generic and specific features of the invention herein described and all statements of the scope of the invention which, as a matter of language, might be said to fall therebetween.

Having described my invention, what I claim as new and desire to secure by Letters Patent, is:

1. In apparatus of the class described, in combination, a valve, a valve seat coacting therewith, a conduit connected with said valve seat, a relatively rotatable member connected with said valve and adapted to move the same toward its seat, and means mounted in said conduit, and upon said member having a surface inclined to the direction of flow of the water, and adapted to receive a rotary impulse therefrom.

2. In apparatus of the class described, in combination, a valve, means adapted to open the same, means adapted to lead a fluid thereto and therefrom, and deflecting means rotatably mounted with respect to said valve and interposed in the path of the fluid and connected with and adapted to move said valve toward closed condition.

3. In apparatus of the class described, in combination, a valve, means adapted to lead a fluid thereto and therefrom, means adapted to move said valve in one direction, and deflecting means having a swivel connection with said valve interposed in the path of the fluid and adapted to move the valve in the other direction.

4. In apparatus of the class described, in combination, a valve, a conduit leading toward said valve, a member connected with said valve and extending within said conduit and mounted to rotate with respect to said valve, and inclined deflecting means connected with said member and extending within the path of fluid flowing in said conduit and adapted to receive a rotary impulse therefrom.

5. In apparatus of the class described, in combination, a valve, a conduit in connection therewith, and deflecting means positioned within said conduit and adapted to receive a rotary impulse from fluid flowing therethrough, said deflecting means being connected with said valve and adapted to move the same toward its seat and being mounted to rotate independently of said valve.

6. In apparatus of the class described, in combination, a valve, a conduit in connection therewith, a member having a swivel connection with said valve and extending within said conduit, and spiral deflecting means connected with said member and extending within the path of fluid flowing through said conduit, said deflecting means being adapted upon fluid passing the same to tend to close said valve.

7. In apparatus of the class described, in combination, a valve, a conduit leading thereto, a pin upon said valve, a member rotatably mounted upon said pin and held in connection with said valve thereby, a spiral wing disposed upon said member within said conduit and adapted to receive a rotary impulse upon fluid passing the same, and means adapted to open said valve.

In testimony whereof I affix my signature, in the presence of two witnesses.

JOHN A. STAPLES.

Witnesses:
 JOHN H. JACKSON,
 FRED NEAL.